Oct. 22, 1935.   C. F. RAUEN ET AL   2,018,032
TRANSMISSION MECHANISM
Filed Jan. 20, 1934   3 Sheets-Sheet 1
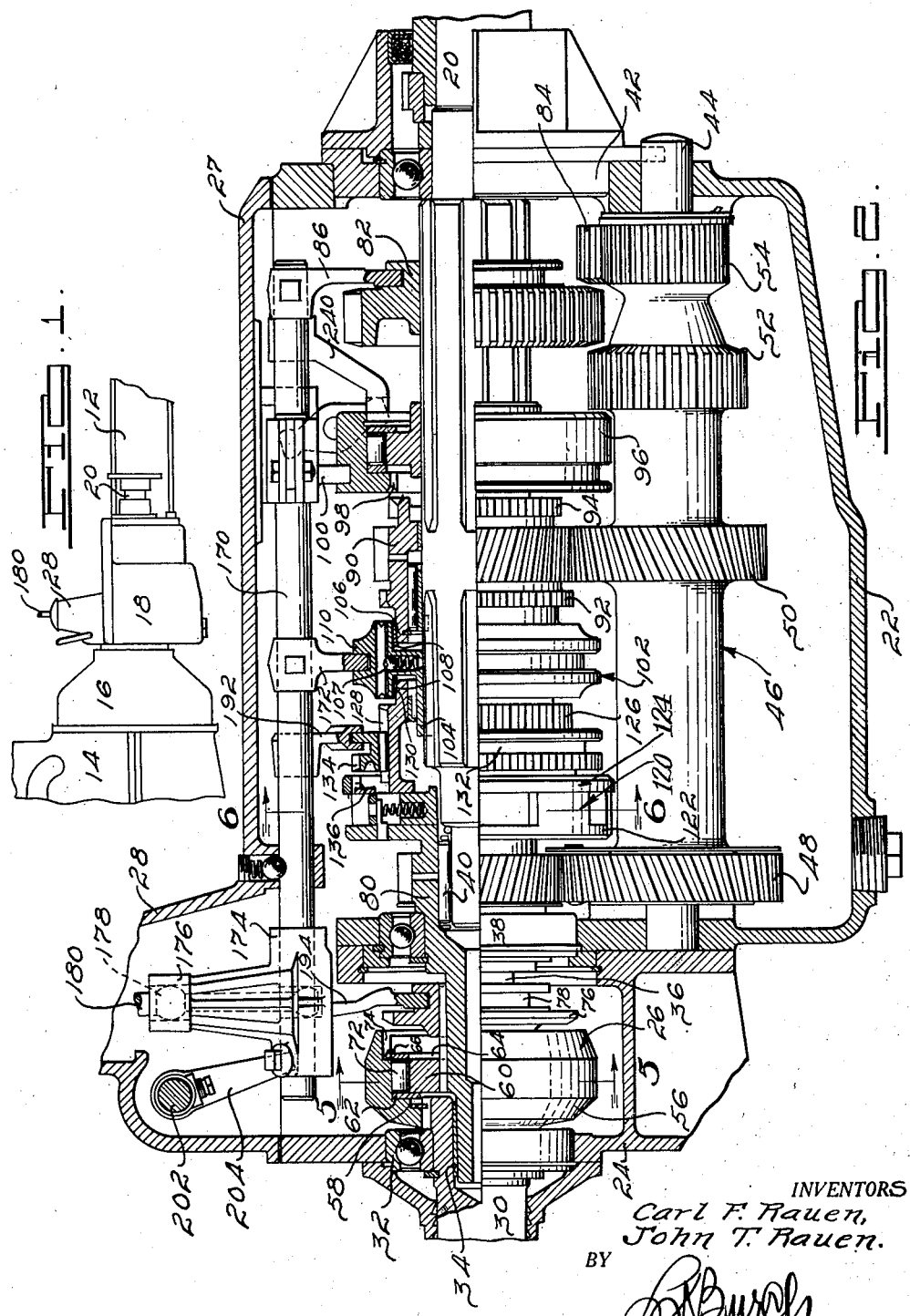
INVENTORS.
Carl F. Rauen,
John T. Rauen.
BY
ATTORNEY.

Oct. 22, 1935.  C. F. RAUEN ET AL  2,018,032
TRANSMISSION MECHANISM
Filed Jan. 20, 1934  3 Sheets-Sheet 2
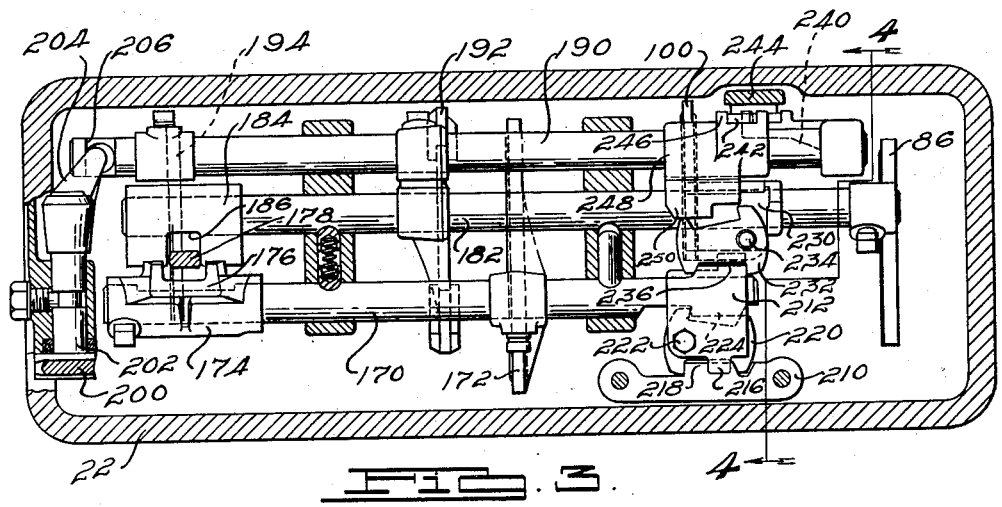
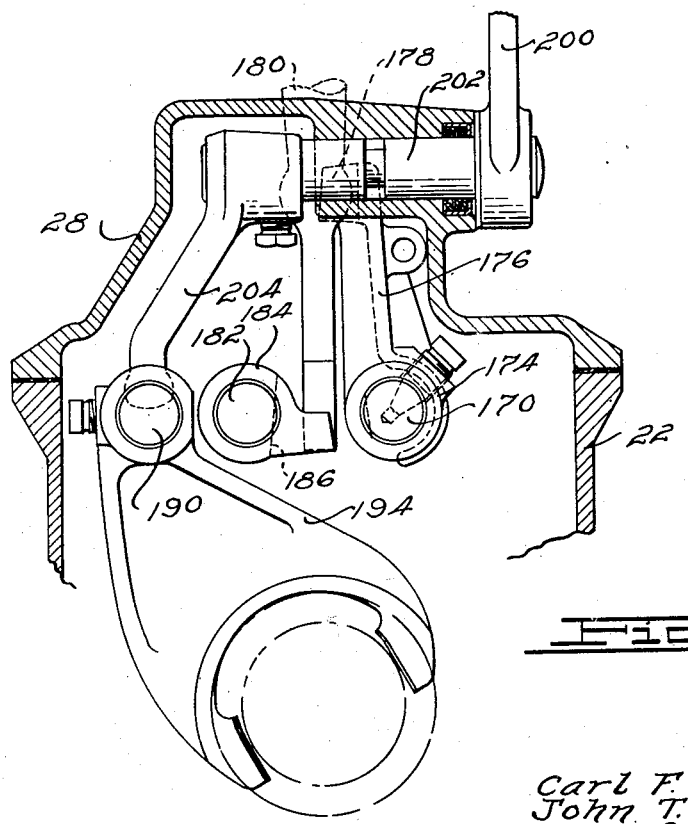
INVENTORS.
Carl F. Rauen,
John T. Rauen.
BY
ATTORNEY.

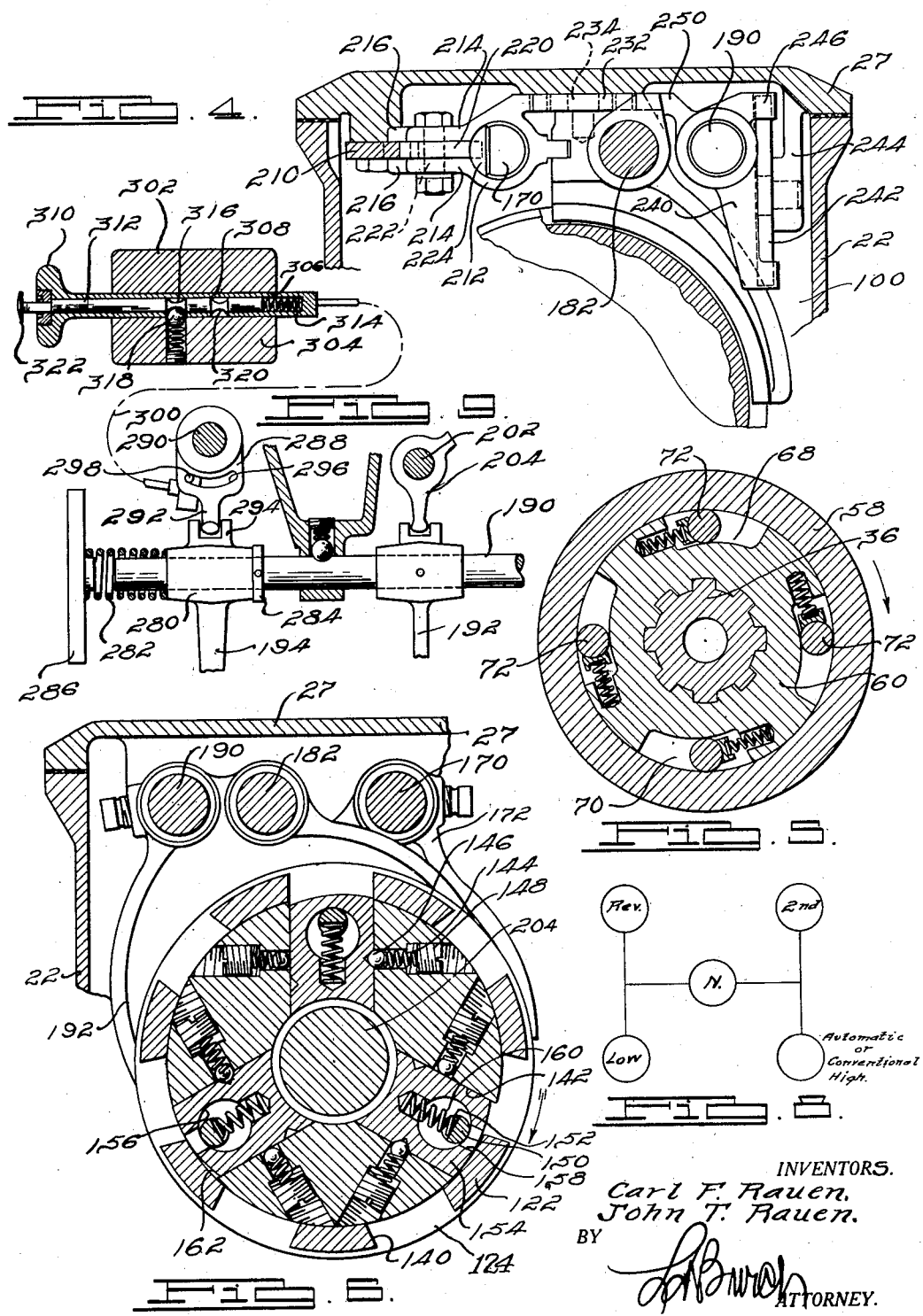

Patented Oct. 22, 1935

2,018,032

UNITED STATES PATENT OFFICE 2,018,032

TRANSMISSION MECHANISM

Carl F. Rauen, Grosse Pointe, and John T. Rauen, Detroit, Mich., assignors, by mesne assignments, to Borg-Warner Corporation, a corporation of Illinois Application January 20, 1934, Serial No. 707,582

14 Claims. (Cl. 74—336)

This invention, in general, relates to power transmitting mechanisms and, as illustrated in the accompanying drawings, is especially adapted for use in automotive vehicles and the like for providing a variable speed driving connection between the engine of such vehicle and the road wheels thereof.

In the manner we have selected to illustrate our invention, the power transmitting mechanism or transmission, as such devices commonly are called, essentially comprises a suitable housing which provides a support for axially aligned driving and driven shafts, a countershaft, and shifter rods which are adapted to be moved by means of a manual control for effecting various changes in the ratio of the driving connection between the driving and the driven shafts. Mounted upon the shaft are a plurality of gears which are adapted to be connected in various combinations by manipulation of the shifter rods to effect or change the ratio of the driving connection between the driving and the driven shafts. Means are also provided for automatically effecting changes in the ratio of the driving connection between the driving and the driven shafts. The shifter rods include means which enables the operator of the vehicle to operate the transmission as a conventional one by manually effecting selective changes in the driving connection between the shafts and also readily to convert the transmission to an automatic one, in which event, certain changes in the ratio of the driving connection between the driving and the driven shafts will be effected automatically responsive to predetermined conditions of operation of the vehicle.

An object of this invention, therefore, is to provide a power transmitting mechanism which may be optionally converted from a conventional transmission to an automatic transmission by the operator of the vehicle.

Another object of this invention is to provide a power transmitting mechanism which will automatically regulate the ratio of the driving connection between the engine and the road wheels of a vehicle in accordance with predetermined conditions of operation thereof, but which may readily be converted to a standard conventional transmission in which the changes in the driving connection may be selectively effected by the operator of the vehicle.

Another object of this invention is to provide means which will enable the operator of the vehicle readily to convert the transmission from an automatic to a conventional one, or vice versa.

Other objects and advantages of this invention will be apparent, and a better understanding of this invention may be had by reference to the following specification, taken in connection with the accompanying drawings forming a part thereof and in which:

Fig. 1 is a diagrammatic view of a portion of an automotive vehicle illustrating the application of a transmission embodying this invention thereto;

Fig. 2 is a longitudinal view, partly in section, of a power transmitting mechanism embodying a preferred form of the invention;

Fig. 3 is a top plan view of the shifter rod mechanism as would appear if the cover of the transmission case were broken away;

Fig. 4 is a view taken along the line 4—4 of Fig. 3, looking in the direction of the arrows, and illustrating some of the constructional details of the shifter rod mechanism;

Fig. 5 is a vertical cross sectional view of an overrunning clutch of the type used herein and taken particularly in a plane on the line 5—5 of Fig. 2, looking in the direction of the arrows;

Fig. 6 is a vertical cross sectional view of an automatic clutch of the type utilized in the construction of the transmission illustrated in Fig. 2 and taken particularly in a plane on the line 6—6 thereof, looking in the direction of the arrows;

Fig. 7 is a front elevational view of the converting means;

Fig. 8 is a diagrammatic illustration of the handle positions of the main control lever as viewed from the position of the operator of the vehicle; and Fig. 9 is a somewhat diagrammatic view of a modified form of control.

Having reference now to Fig. 1 of the drawings, there is shown, diagrammatically, a portion of an automotive vehicle having a main frame 12, adapted to be suitably supported by the road wheels of the vehicle and providing a support for an engine 14, a housing-enclosed clutch mechanism 16, a transmission 18, and a propeller shaft 20, which is connected to the road wheels of the vehicle through a suitable universal joint mechanism.

Referring now particularly to Fig. 2 of the drawings, a casing 22 is provided for housing and supporting the operating mechanism and carries at its forward end a relatively small casing 24, which is adapted to house a free wheeling clutch indicated generally at 26. A cover plate 27 provides a closure for the casings 22 and 24 and a support for a bell housing 28 which carries the controls by means of which the transmission is manually controlled.

A driving shaft 30, adapted to be connected with the engine through the medium of the housing-enclosed clutch mechanism 16, is journaled in a bearing 32, suitably secured in an aperture in the forward wall of the free wheeling casing 24 and is provided with a counterbore in which a bushing 34 is provided for rotatably supporting an intermediate shaft 36, which is journaled at a rear portion in a bearing 38, suitably secured in an aperture in the forward wall of the transmission casing 22. Shaft 20, at its forward end, is journaled in a roller bearing 40, secured in a counterbore provided in the posterior end of the intermediate shaft 36, and at its rearward end is journaled in a bearing 42, suitably secured and supported in an aperture in the rearward wall of the transmission casing 22. A countershaft 44, disposed in parallelism with the driven shaft 20, has its ends secured in the forward and rearward walls of the transmission casing 22 and is locked against rotation. A cluster of gears, indicated generally at 46 and comprising helical gears 48 and 50 and gears 52 and 54, is rotatably secured upon the countershaft 44.

A free wheeling clutch, indicated generally at 26, is adapted to connect shaft 36 to the driving shaft 30 to be driven thereby and to permit intermediate shaft 36 to overrun the driving shaft 30. The free wheeling clutch comprises a drum-shaped shell 56, fixedly splined to driving shaft 30 and confined against lateral displacement by bearing 32 and snap ring 58. An annular plate 60, splined to the forward end of the intermediate shaft 36, comprises the driven element of the free wheeling clutch, and is disposed within the drum portion of the shell or driving element 56 of the free wheeling or over-running clutch and between thrust washers 62 and 64, the latter of which is held in place by a snap ring 66, for the purpose of retaining the driven element 60 in operative relationship with the driving element 56.

For a better understanding of the free wheeling or overrunning clutch, reference may now be had to Fig. 5 of the drawings wherein a cross sectional view of the clutch is illustrated. It will be observed that the driven member 60 of the clutch is provided with a plurality of annularly spaced recesses 68, the bottom surfaces of which are eccentric with respect to the axis of rotation of the driven member 60. The recesses 68 are adapted to provide a plurality of eccentric raceways 70, uniformly spaced about the periphery of the driven member 60, and the walls of which are formed by oppositely disposed surface portions of the driving and driven elements of the free wheeling clutch.

Each of the raceways 70 is provided with a spring pressed roller 72, which is biased toward the restricted end of the raceways. The rollers 72 are slightly larger in diameter than the restricted portion of the raceways 70, so that the rollers normally assume a wedging relationship in the restricted portion of the raceways between the oppositely disposed surfaces of the driving and driven elements of the free wheeling clutch. Rotary movement of the driving element 58, in the direction indicated by the arrow in Fig 5, will wedge rollers 72 in the restricted portions of the raceways whereby the driven element 60 will be carried with and rotate with the driving element 58. Assuming that a turning movement is applied to the driven element 60, in the direction indicated by the arrow, the rolling of the rollers 72 upon the internal surface of the driving element 58 against which they are biased by centrifugal force generated by rotation of the clutch element will be sufficient to overcome the effect of the spring pressure and hold the rollers out of wedging relationship whereby the driving element 58 will remain at rest. This action will occur whenever the element 60 becomes the driving element such as sometimes occurs when a vehicle is coasting and the engine throttle is closed, assuming that the shaft which carries the driven element 60 at such time is connected to the road wheels of the vehicle.

For the purpose of locking the driving shaft 30 to the intermediate shaft 36 to provide a two-way drive therebetween as distinguished from a free wheeling drive, the driving element 58 of the clutch is provided with a set of internal teeth 74 which are adapted to mate with an external set of teeth 76 provided upon the periphery of a sleeve 78 which is slidably splined to the intermediate shaft 36. Whenever sleeve 78 is shifted to the left, looking at Fig. 2, to mate teeth 76 with teeth 74 of the driving element 56 of the clutch, the free wheeling action of the clutch is eliminated and the shafts 30 and 36 are locked together.

The location of the free wheeling clutch forward of the transmission has the effect of automatically disconnecting the operating mechanism of the transmission from the engine whenever the engine throttle is closed, which will facilitate gear changes since torque between the driving gears will then be substantially eliminated. This particular location of the free wheeling clutch also produces what is sometimes referred to as "free wheeling in all speeds"; that is, the driving connection between the engine of the vehicle and the road wheels thereof is such that the engine cannot act as a brake for the vehicle, whenever the throttle of the engine is closed to reduce the speed thereof below car speed.

While we have shown a transmission embodying our invention with a front end free wheeling clutch, it should be understood that use of this clutch unit is optionable and may, if desired, be dispensed with. The use of a free wheeling clutch at the forward end of the transmission does, however, afford many advantages, and it appears preferable to provide the free wheeling clutch with a lock-out to eliminate the free wheeling action of the same at such times as it may be desired by the operator of the vehicle.

A portion of the intermediate shaft 36 projecting within the casing 22 may be formed to provide a helical gear 80, which constantly meshes with helical gear 48 of the cluster of gears for the purpose of driving the same. A gear 82 is slidably splined to the driven shaft 20 adjacent the rearward end thereof and is adapted to mesh with gear 52 of the cluster of gears for the purpose of providing a low speed driving connection between the driving and the driven shafts and through the intermediary of clutch 26, intermediate shaft 36, and helical gears 80 and 48. Slidable gear 82 is adapted to be shifted to the right, looking at Fig. 2, to mesh with an idler gear 84, which constantly meshes with gear 54 and for the purpose of providing a reverse driving connection between the driving and the driven shafts. A yoke 86, associated with the shifter mechanism, is provided for adjusting the position of the slidable gear 82.

An intermediate speed helical gear 90 is rotatably mounted upon driven shaft 20 and is secured against lateral displacement thereon. Gear 90 constantly meshes with helical gear 50 of the cluster of gears. Gear 90 is provided with external sets of teeth 92 and 94 upon each side thereof. Gear 90 is adapted to be connected to the shaft 29 for the purpose of driving the same by a free wheeling clutch 86 which is adapted to be shifted to the left, looking at Fig. 2, to mate teeth 98 internally provided upon the outer element of the clutch with external teeth 94 provided on the intermediate speed helical gear 90.

Free wheeling clutch 96 is similar in construction and operation to the free wheeling clutch indicated generally at 26 and a cross sectional view of which is illustrated in Fig. 5 of the drawings. Clutch 96, when connected to the intermediate speed helical gear 90, while adapted to drive the driven shaft, will permit the same to overrun the intermediate speed gear 90. A yoke 100, associated with the shifter rod mechanism, is provided for shifting the free wheeling clutch 96 into and out of operative position. Intermediate speed gear 90 is adapted to be positively locked to the driven shaft 20 through the medium of a synchronizer clutch unit generally indicated at 102. Synchronizer clutch unit 102 comprises a hub 104 which is provided with an annular portion of T-shaped cross section, the periphery of which is provided with external teeth. The annular T-shaped portions are adapted to overlie conical portions 106 and 130 of the intermediate speed gear 90 and of a clutch element 126, respectively. Synchronizer cones comprising a tapered bushing 108 are disposed between the internal surface of the T-shaped portions and the conical portions 106 and 130. A synchronizer ring 110, internally provided with teeth, mates with the annular T-shaped portion of the hub 104 and is adapted to be laterally displaced to the right, looking at Fig. 2, to mate with external teeth 92 provided upon the intermediate speed gear for the purpose of positively locking the same to the driven shaft 20. Lateral displacement of the synchronizer ring 110 is adapted slightly to displace hub 104 which will result in wedging the synchronizer cone 108 between the T-shaped portion of the hub 104 and the conical portion 106 of the intermediate speed gear 90. This wedging action will tend to synchronize the rotative speeds of hub 104, which is splined to the driven shaft 20, and intermediate speed gear 90, which is rotatably mounted upon the driven shaft 20, prior to the effecting of a positive locking connection between the intermediate speed gear 90 and the driven shaft 20. This synchronizing action eliminates the speed differential between teeth about to be meshed so that they may be intermeshed without a "clash".

While we have illustrated a synchronizer clutch in connection with the transmission embodying our invention, it should be understood that the use of the synchronizer clutch may be dispensed with, if desired. The annular T-shaped portion of the hub 104 is centrally provided with a plurality of annularly spaced spring-pressed poppets 107 which engage in an annular groove internally provided in the synchronizer ring 110 intermediate the ends thereof, so that when the synchronizer ring 110 is laterally shifted, the hub 104 tends to move therewith.

An automatic clutch unit 120 is disposed between helical gear 80 and synchronizer clutch unit 102 and comprises a driving element 122 in the form of a drum-shaped shell and a driven member 124 in the form of a cylindrical plate and having a laterally projecting cylindrical portion 126.

The cylindrical portion 126 is externally provided with a set of teeth 128 which are adapted to mate with the synchronizer ring 110 when the same is shifted to the left, looking at Fig. 2 to connect the driven member 124 with the driven shaft 20. The cylindrical portion 126 is provided with a conical portion 130, which is adapted to underlie a portion of the annular T-shaped portion of hub 104. One of the synchronizer cones 108 is disposed between conical portion 130 and the overhanging portion of the T-shaped hub 104 and is adapted to synchronize the speed of rotation of the member 126 and the hub 104 when the synchronizer ring 110 is shifted to the left, just before it mates with external teeth 128 for the purpose of locking the driven member of the automatic clutch to the driven shaft 20.

For the purpose of locking the driving and driven members of the automatic clutch together, there is provided a ring 132, slidably splined upon the cylindrical portion 126 of the driven member and provided with an external set of teeth 134, which are adapted to mate with an internal set of teeth 136 provided upon the driving member 122 of the automatic clutch, whenever the ring 132 is shifted to the left, looking at Fig. 2.

When ring 132 is in this position and synchronizer ring 110 is in its leftmost position, that is, connecting the driven member of the automatic clutch to hub 104, the intermediate shaft 36 will be positively locked to the driven shaft 20 and may be considered as a portion thereof.

For a better understanding of the construction and operation of the automatic clutch, reference may now be had to Fig. 6, wherein is illustrated a cross sectional view of the automatic clutch employed in this transmission. The driving member 122 of the automatic clutch comprises a drum-shaped shell formed on the posterior end of the shaft 36 and having a plurality of uniformly spaced slots 140 in the periphery thereof. The cylindrical plate portion of the driven member 124 is provided with a plurality of uniformly spaced, radially extending slots 142 which are of approximately the same width as are the slots 140. Extending at right angles to the sides of each of the slots 142 is a bore 144, in each of which there is disposed a spring-pressed poppet 146 backed by an adjustable plug 148 which is threadedly secured in an enlarged portion of the bore 144.

Projecting into the central portion of each of the slots 142 is a pin 150 having a flatted portion 152. In each of the slots 142 there is slidably disposed a bolt 154 which is provided with a transverse bore 156 for receiving the pin 150 and a longitudinally extending bore 158 between the end of which and the flatted portion 152 of the pin 150 there is confined a spring 160 which is adapted to resist radial outward movement of the bolt such as that induced by centrifugal force resulting from rotation of the driven member 124.

The spring 160 is adapted to hold the bolts 154 in their retracted position until the centrifugal force resulting from rotation of the driven member 124 is sufficient to overcome the effect of the spring 160. It will be apparent that on account of the relative spacing of the bolts 154 and the slots 140 that only one of the bolts at any one time may be in a projected position, since the driven member 124 is retained within the shell of the driving member 122. Each of the bolts 154 is provided with an eccentric circumferential surface 162 which will enable the bolt to jump the slots in the driving member until the speeds of rotation of the members are substantially the same.

In operation, the driving member is connected to the driving shaft of the vehicle, and the driven member is connected to the driven shaft of the vehicle and rotates therewith when a low speed driving connection is effected between the driving and the driven shafts. After the speed of the driven shaft attains a predetermined rate, the bolts 154 have a tendency to fly outwardly, but because the driving member of the clutch, which is rotating with the driving shaft, will necessarily be rotating at a greater rate of speed, no one of the slots will line up with any one of the bolts for a sufficient period of time to enable the bolts to be projected outwardly into the slot, particularly in view of the eccentric surface 162 provided on the circumferential face of the bolt 154. When the speed of the driving shaft is cut such as by a momentary closing of the throttle governing the speed of the engine, the driving element 122 of the clutch will decelerate until its speed approximates that of the driven element 124 of the clutch, when one of the bolts 154 will be projected outwardly into one of the slots 140, at which time the members of the automatic clutch will become interconnected, as well as the shafts connected thereto. When the throttle governing the speed of the engine is subsequently opened, the driven shaft will be driven directly from the driving shaft through the automatic clutch.

It will be observed that each of the bolts 154 is provided with a notch on each side thereof which are offset with respect to each other. When the bolts 154 are in their retracted position, one of the poppets 146 will engage a notch in the side of the bolt and will have the effect of resisting the radial outward movement of the bolt 154. This poppet holds the bolts 154 in its retracted position until sufficient centrifugal force has been generated to overcome the force of the spring 160 and snap the bolt 154 to its outward position. A similar poppet 146 is adapted to engage a notch in the opposite side of the bolt 154 when the same is in its projected position, for the purpose of holding the bolt in such position until the force of the spring 160 is sufficiently greater than the centrifugal force resulting from rotation of the driven member 122 to snap the bolt 154 to its retracted position.

For the purpose of shifting the operating mechanism on the transmission to effect changes in the ratio of the driving connection between the driving and the driven shafts, there is provided shifter rod mechanism associated with manually controlled levers whereby the operator of the vehicle may selectively effect any desired ratio in the driving connection between the driving and the driven shafts. Having reference now particularly to Figs. 3, 4 and 7, it will be seen that the upper portion of the transmission case is provided with a plurality of slidable rods or rails. Shift rod 170 is provided with a yoke 172 rigidly affixed thereto for effecting a shift of synchronizer ring 110 and at the forward end is provided with a collar 174 having an upstanding portion 176 which is adapted to receive a shank portion 178 of a main control lever 180 whereby a relatively large amount of force may be exerted by the hub 104 upon the synchronizer cone 108 to expedite the synchronizing action of the clutch 102.

Yoke rod 182 has rigidly secured thereto at one end thereof yoke 86, which shifts gear 82, and at the opposite end is provided with a collar 184 affording a gate 186 which is engageable by the bottom end of the manual control lever 180 whereby the position of gear 82 may be adjusted to effect a reverse or a low speed drive by movement of the handle of the main control lever 180 to a corresponding position, as indicated in Fig. 8.

Shifter rod 190 has affixed thereto yoke 192 which controls movement of the ring gear 132 and yoke 194 which controls the lock-up member 78 of the front end free wheeling clutch 26. Since the relative position of yokes 192 and 194 is fixed, it will be apparent that when the ring gear 132 is moved to the left to lock the driving and driven members of the automatic clutch 120 together, the lock-up member 78 will be moved to lock intermediate shaft 36 to the driving shaft 30. An auxiliary control lever 200 is provided for shifting yoke rod 190 through the medium of a rockable shaft 202 journaled in the bell housing 28, and a lever 204 carried by shaft 202 and engaging a groove 206 provided on the upper side of the forward end of rod 190.

In the position in which the parts are shown in the drawings, the transmission is set in neutral position, but for automatic operation from second to high, and vice versa. The position of the auxiliary control lever 200 determines the character of the operation of the transmission. When lever 200 is moved to its other position, the automatic clutch 120 and free wheeling clutch 126 will be in effect locked out, and the transmission may then be operated as a conventional transmission.

Adjacent the rearward end of the shifter rod, a rack bar 210 is fixedly secured to the cover 27. A sleeve 212 slidably mounted upon shift rod 170 is provided with a pair of laterally extending arms 214 provided with lugs 216 which are adapted to engage opposite sides of a lobe 218 provided on the bar 210 for the purpose of holding the sleeve 212 against rotation on the shaft 170. A rocker 220, disposed between the arms 214 and pivoted thereto at 222, is provided with a plurality of fingers cooperable with the lug 218 on the bar 210 and with a lug 224 formed on the shift rod 170 by cutting away portions on opposite sides thereof. When shift rod 170 is moved to the right, looking at Fig. 3, sleeve 212 will be freed from movement with the shift rod since the rocker 220 will be held against movement by engagement with lobe 218 of the bar 210.

However, when shift rod 170 is shifted to the left, looking at Fig. 3, rocker 220 will free itself from engagement with yoke 218 by turning about its pivot 222 and will engage with lug 224 on the shift rod, whereby the sleeve 212 will be carried along with the shift rod 170 to the left.

Shift rod 182 is provided with a sleeve 230, which carries yoke 100, and a rocker 232 pivoted to the upper side thereof at 234. Rocker 232 is provided with a plurality of fingers at the ends thereof for engagement with a lug 236 provided upon the sleeve 212. It will be apparent, then, that when shift rod 170 is moved to the left, it will carry sleeve 212 with it, and through the engagement with rocker 232, carry sleeve 230 and yoke 100 to the left, thereby shifting free wheeling clutch 96 into engagement with intermediate speed gear 90.

Since synchronizer ring 110 is moved by shifting of rod 170, it will be apparent that when the rod 170 is shifted to the left, the driven member 124 of the automatic clutch 120 will be connected to the driven shaft 20 and the intermediate speed gear 90 will be connected to the driven shaft 20 through the free wheeling clutch 96 whereby the rotation of the driven shaft will be initiated. After the speed of rotation of the driven shaft 20 has attained a predetermined rate, the radially movable bolts 154, carried by the driven member of the automatic clutch 120, will attempt to fly outwardly automatically to connect the driving and driven members of the automatic clutch 120. As previously explained, the bolts 154 will be ineffective to connect the driving and driven members of the clutch until the speed of rotation of the driving member of the clutch is decelerated to approximately that of the driven member, such as by a momentary closing of the engine throttle, whereby the driving connection between the shafts will be through the automatic clutch 120, and the driven shaft will overrun the intermediate speed gear 90 on account of the free wheeling clutch 96.

After the speed of rotation of the driven shaft falls below that necessary to maintain the bolts in their outward position, the same will be retracted to their inward position, assuming that the torque between the driving and driven members of the automatic clutch momentarily is released, whereupon the direct driving connection will be broken and the intermediate speed gear 90 will become effective for continuing the drive of the driven shaft at a rate of speed reduced with respect to the driving shaft. It will also be apparent that if the manual control 180 is returned to neutral position, the connection between the driven member 124 of the automatic clutch and the driven shaft 20 and the connection between the intermediate speed gear 90 and the driven shaft 20 will be broken, and the transmission will be set for neutral position.

If, however, the auxiliary control lever 200 is moved to the position opposite from that in which it is shown in the drawings, the driving and driven members of the automatic clutch 120 will be locked together by ring gear 132, and the driving shaft 30 will be locked to the intermediate shaft 36 whereby the free wheeling character of the drive will be eliminated and the automatic clutch will be locked out of operation.

In order to shift the free wheeling clutch 96 out of operation when the free wheeling clutch 26 and the automatic clutch 120 are locked up, to eliminate the reverse locking action of the free wheeling clutch 90, shift rod 190 is provided with a downwardly and forwardly projecting arm 240 which engages the lower end of a lever 242 pivoted to a lug 244, depending from the cover 27. The upper end of the lever 242 engages a fork 246 provided on a sleeve 248 slidably mounted upon the shift rod 190. Sleeve 248 is provided with a lug 250 which, as shown, is free from engagement with rocker 234 pivoted upon sleeve 232, but which is adapted to pivot the rocker about its pivot to free the sleeve 232 from movement to the left with sleeve 212. Movement of sleeve 248 to the right, looking at Fig. 3, is accomplished by a movement of yoke rod 190 to the left, and through the intermediary of arm 240 and lever 242, sleeve 248 is shifted in a direction opposite to that in which the yoke rod 190 is moved, whereby the boss 250 will be shifted into a position opposite the fingers on the rocker 232 whereby when sleeve 212 is shifted to the left, the rocker 232 and sleeve 230 will be locked to the sleeve 248 through the interengagement of the rocker 232 and the boss 250.

Thus, if yoke 100 and free wheeling clutch 96 were in their leftmost position and the auxiliary control lever 200 was shifted to the position opposite to that in which it is shown, the free wheeling clutch 96 will be shifted out of operative relationship with the intermediate speed gear 90, and at that time a positive locked-up direct drive would be provided between the driving and the driven shafts, since both the free wheeling clutch 26 and the automatic clutch 120 will have been locked up by such a shifting of the auxiliary control lever 200.

When the transmission is set to operate automatically, that is, to provide an automatic change in the driving connection between second and high speeds, the synchronizer ring 110 and the free wheeling clutch 96 will both be shifted to the left simultaneously. The synchronizer ring 110 may, by itself, be shifted to the right, looking at Fig. 2, to positively lock the intermediate speed gear 90 to the driven shaft 20, and to that end the sleeve 230 is dropped when shift rod 170 is moved to the right, looking at Fig. 3.

In Fig. 9 there is illustrated, somewhat diagrammatically, a modified form of control whereby the front end free wheeling clutch 26 may be locked up without locking up the automatic clutch 120. In this figure the shift rod 190, which is adapted to be moved by levers 204 fixedly secured to rockable shaft 202 which in turn is actuated by auxiliary hand control lever 200, may have freely mounted upon the forward end of said shaft 190 a freely movable sleeve 280 to which the yoke 194 for the lock-up member 78 of the front end free wheeling clutch 26 may be secured. Sleeve 280 is biased to the right, looking at Fig. 9, against a collar 284 pinned to the rod 190 by a spring 282 which is confined between a wall portion 286 of the transmission casing and said sleeve 280 for the purpose of holding the lock-up member 78 of the front end free wheeling clutch 26 out of operative position.

An actuating lever 288, pivotally mounted upon a suitable shaft 290, is provided with a portion 292 for engagement with a gate 294 provided upon the freely movable sleeve 280 and is further provided with a slot 296 in which a pin 298 carried by one end of a Bowden wire 300 is movable. The opposite end of the Bowden wire 300 may be connected to a suitable hand control 302 which may be secured upon the dash board in the driver's compartment of the vehicle and which in general comprises a supporting member 304 provided with a longitudinal bore 306 in which a sleeve 308 is slidably secured and which is provided with a knob 310 at one end thereof and the other end of which is connected to one end of the Bowden wire 300. A keeper rod 312 slidably disposed within sleeve 306 and biased out of the same by a spring 314 is provided with a plurality of spaced annular recesses 316 which afford keepers for a latch 318 projectible through apertures 320 in the sleeve 306 for the purpose of securing the sleeve 306 in position. The keeper bar 312 may be provided with a release button 322 for releasing the latch so that sleeve 306 and Bowden wire 300 may be moved.

Movement of the sleeve 306 to a position other than that in which it is shown in the drawings is adapted to pivot actuating lever 288 about shaft 290 for the purpose of shifting sleeve 280 along rod 190, which will shift lock-up member 78 into operative position to lock out the free wheeling action of front end free wheeling clutch 26, in which event the shafts 30 and 36 will be locked together. When the front end free wheeling clutch 26 is locked up by the use of the Bowden wire control, the automatic clutch 120 will not be affected, since the sleeve 280 will move along rod 190 without affecting automatic clutch 120. However, when lever 204 is utilized for shifting rod 190 to lock up the automatic clutch 120, the collar 284 pinned to the shaft 190 will carry sleeve 280 and yoke 194 to the left for the purpose of locking up the front end free wheeling clutch 26 simultaneous with locking up the automatic clutch 120. When the lever 204 is actuated for shifting rod 190 to the right to move ring gear 132 out of locking position, the spring 282 will bias sleeve 280 and lock-up member 78 to the right so that the automatic clutch 120 and the free wheeling clutch 26 will be simultaneously unlocked.

While several specific embodiments of our invention have been illustrated and described, it must be appreciated that many modifications may be made in the construction thereof without departing from the scope of the invention, and for that reason we do not desire to be limited to any particular form or arrangement except in so far as such limitations are included in the following claims.

We claim:

1. In a power transmitting mechanism for providing a variable speed driving connection between the engine of a vehicle and the road wheels thereof, the combination of a driving shaft adapted to be connected to the engine of a vehicle, an intermediate shaft, a driven shaft connected to the road wheels of a vehicle for driving the same, all of said shafts being in axial alignment, an overrunning clutch operatively disposed between said driving and intermediate shafts, speed reduction means including a free wheeling clutch operable for connecting said intermediate and driven shafts to effect a free wheeling driving connection between said driving and driven shafts to initiate the rotation of said driven shaft at a relatively low rate of speed with respect to that of the driving shaft, an automatic clutch including members operatively associated with the intermediate and said driven shafts, said members being operable responsive to predetermined conditions of rotation thereof at such time as said free wheeling driving connection is provided for direct connecting said intermediate and driven shafts whereby the driven shaft will be rotated at a direct and a relatively low rate of speed with respect to that of the driving shaft, and means for simultaneously locking up said overrunning and automatic clutches to provide a positive direct driving connection between said driving and driven shafts whereby the rotation of said driven shaft will be continued at a direct rate of speed with respect to that of said driving shaft.

2. In a power transmitting mechanism for providing a variable speed driving connection between the engine of a vehicle and the road wheels thereof, the combination of a driving shaft adapted to be connected to the engine of a vehicle, an intermediate shaft, an overrunning clutch operatively disposed between said driving and intermediate shafts and adapted to provide a one-way driving connection therebetween, a driven shaft connected to the road wheels of a vehicle for driving the same, means for connecting said intermediate shaft and said driven shaft to initiate the rotation thereof, an automatic clutch operatively disposed between said intermediate and driven shafts and operable for connecting the same to provide a driving connection between said shafts at any speed of rotation of said driven shaft above a predetermined rate, and at a higher ratio than said initial drive, and commonly actuated means for simultaneously locking said overrunning and automatic clutches out of the driving connection between said shafts whereby the rotation of said driven shaft will be positively continued at a direct rate with respect to that of said driving shaft.

3. A power transmitting mechanism having in combination a driving shaft, a driven shaft adapted to be connected thereto to be driven thereby, an automatic clutch disposed between said shaft and having a driving member connected to the driving shaft and a driven member disconnected from but adapted to be connected to the driven shaft, means for connecting said driven clutch member to said driven shaft, means for connecting said shafts around said clutch to initiate the rotation of said driven shaft, manipulative means for simultaneously rendering said connecting means effective, said automatic clutch being thereafter effective for interconnecting said shafts at any time subsequent to the attainment of a predetermined speed of rotation by said driven shaft, and auxiliary control means operable for locking said driving and driven clutch members together whereby said manipulative means may be operated to selectively actuate said connecting means to effect changes in the driving connection between said shafts without regard to the speed of rotation of said driven shaft.

4. A power transmitting mechanism having in combination a driving shaft, a driven shaft adapted to be connected thereto to be driven thereby, an automatic clutch operatively disposed between said shafts and having a driving member connected to the driving shaft and a driven member adapted to be connected to the driven shaft, a gear rotatably mounted on said driven shaft and driven through a train of gearing from said driving shaft, means for connecting said driven clutch member to said driven shaft, a free wheeling clutch for connecting said driven shaft to said gear to be driven thereby, said automatic clutch thereafter being operable responsive to predetermined conditions of rotation of said shafts for effecting a direct drive between the same whereby said driven shaft will overrun said gear, means for locking said members of the automatic clutch together whereby the direct drive between said shafts will be continued irrespective of the condition of rotation of said shafts, and means operable incidental to the locking of said automatic clutch members together for shifting said free wheeling clutch out of engagement with said gear.

5. A power transmitting mechanism having in combination a driving shaft, a driven shaft, an automatic clutch operatively disposed between said shafts and having a driving member connected to said driving shaft and a driven member adapted to be connected to said driven shaft and operable responsive to predetermined conditions of rotation of said shafts for directly connecting the same, a gear rotatably mounted on said driven shaft and driven through a train of gearing from said driving shaft, a free wheeling clutch mounted on said driven shaft and adapted to be shifted into engagement with said gear to provide a one-way driving connection between the same and said driven shaft to initiate the rotation thereof, a clutch member mounted for rotation with said driven shaft and adapted to be shifted into engagement with the driven member of said automatic clutch for connecting the same to said driven shaft, commonly actuated means for simultaneously shifting said free wheeling clutch and said clutch member into operative engagement with said gear and said driven clutch member respectively, means for selectively locking said members of said automatic clutch together, and auxiliary control means for simultaneously shifting said free wheeling clutch out of engagement with said gear and locking together said automatic clutch members.

6. A power transmitting mechanism having in combination a driving shaft, a driven shaft, a driving clutch member on each of said shafts adapted to rotate at different speeds and driven by said driving shaft, a driven clutch member for each of said driving clutch members and mounted for rotation with said driven shaft, commonly actuated means for shifting said driven clutch members into operative position whereby the slower rotating of said driving clutch members will be connected to said driven shaft to initiate the rotation thereof and the faster rotating of said driving clutch members will thereafter automatically be connected to said driven shaft to provide a direct driving connection between said shafts, and auxiliary control means for locking up the faster rotating of said driving clutch members with said driven clutch member associated therewith and simultaneously therewith shifting the other of said driven clutch members into inoperative position.

7. A power transmitting mechanism having in combination a driving shaft, a driven shaft, a gear rotatably mounted on said driven shaft and adapted to be connected to the driving shaft to be driven thereby, a free wheeling clutch slidably mounted upon said driven shaft and adapted to be shifted into operative engagement with said gear to provide a one-way driving connection between the same and said driven shaft, an automatic clutch operatively disposed between said shafts and having a driving member connected to the driving shaft, a driven member adapted to be connected to the driven shaft, and means carried by one of said members and operable responsive to predetermined conditions of rotation of said members for interconnecting the same to provide a direct driving connection between said shafts, a positive clutch adapted for selectively connecting said driven clutch member or said gear to said driven shaft, commonly actuated means for simultaneously shifting said free wheeling clutch and said positive clutch into engagement with said gear and said driven clutch member respectively to initiate the rotation of said driven shaft and whereby said automatic clutch thereafter may be operable to effect a direct driving connection between said shafts, means for locking up said members of said automatic clutch without regard to the condition of rotation thereof, and auxiliary control means operable for shifting said free wheeling clutch out of engagement with said gear incidental to locking up said automatic clutch members.

8. A power transmitting mechanism adapted to provide a variable speed driving connection between the engine of a vehicle and the road wheels thereof comprising a driving shaft adapted to be connected to the engine of the vehicle, a driven shaft connected to the road wheels of the vehicle for driving the same, a gear rotatively mounted on said driven shaft and driven through a train of gearing from said driving shaft, a free wheeling clutch slidably mounted on said driven shaft and adapted to be shifted into operative engagement with said gear to provide a one-way driving connection between said gear and said driven shaft, an automatic clutch operatively disposed between said shafts and having a driving member connected to the driving shaft, a driven member adapted to be connected to the driven shaft, and means carried by one of said members and operable responsive to predetermined speeds of rotation of said members for interconnecting the same to provide a direct driving connection between said shafts, a positive clutch carried by said driven shaft and adapted to be selectively shifted into engagement with said gear or the driven member of said automatic clutch to provide a two-way driving connection between the same and said driven shaft, means for locking said automatic clutch members together whereby said positive clutch may be shifted to effect selective changes in the ratio of the driving connection between said shafts, and auxiliary means for shifting said locking means out of the driving connection between said shafts and for shifting said free wheeling clutch into operative engagement with said gear whereby automatic changes in the ratio of the driving connection between said shafts may be effected.

9. A variable speed power transmitting mechanism having in combination a driving shaft, a driven shaft, an automatic clutch operatively disposed between said shafts and having driving and driven members associated with said driving and driven shafts respectively, a gear rotatably mounted on said driven shaft and adapted to be driven by said driving shaft, a free wheeling clutch slidably mounted on said driven shaft and adapted to be shifted into operative engagement with said gear to provide a one-way driving connection between the same and said driven shaft, a positive clutch slidably mounted on said driven shaft and adapted to be selectively shifted into engagement with said driven clutch member or said gear respectively to provide two-way driving connections between the same and said driven shaft, means for interconnecting the positive and free wheeling clutch for simultaneously shifting the same into engagement with said driven clutch member and said gear respectively whereby said automatic clutch may subsequently be operable to effect a direct driving connection between said shafts, control means for disconnecting said positive and free wheeling clutches whereby said positive clutch may be shifted relative to said free wheeling clutch for effecting selective changes in the ratio of the driving connection between said shafts and without regard to the condition of operation thereof, and means operable incidental to disconnecting said positive and free wheeling clutches for locking up said automatic clutch.

10. A power transmitting mechanism having in combination a driving shaft, a driven shaft, a gear rotatably mounted on said driven shaft and adapted to be driven by said driving shaft, a free wheeling clutch slidably mounted on said driven shaft and shiftable into engagement with said gear to provide a one-way drive between the same and said driven shaft, an automatic clutch operatively disposed between said shafts and operable responsive to predetermined conditions of rotation of said shafts for effecting a direct driving connection therebetween whenever said free wheeling clutch is in engagement with said gear, said automatic clutch having a member adapted to be driven by the driving shaft and a driven member adapted to be connected to the driven shaft, a positive clutch slidably mounted upon said driven shaft and adapted to be selectively shifted into engagement with said gear or the driven member of said automatic clutch respectively to provide a two-way driving connection between the same and said driven shaft, a lock-up for said automatic clutch for locking the members thereof for rotation together, independent control means for shifting said positive clutch and said lock-up, and means for shifting said free wheeling clutch through the agency of either of said independent means.

11. A power transmitting mechanism having in combination a driving shaft, a driven shaft, a gear rotatably mounted on said driven shaft and driven through a train of gearing by said driving shaft, an automatic clutch operatively disposed between said shafts and having a driving member driven by the driving shaft and a driven member adapted to be connected to the driven shaft for driving the same, said driven clutch member being operable responsive to predetermined conditions of operation of said shaft for engaging said driving member to effect a direct driving connection between said shafts, a lock-up for said clutch members whereby a direct driving connection between said shafts may be provided without regard to the condition of operation of said shafts, a free wheeling clutch slidably mounted upon said driven shaft and adapted to be shifted into engagement with said gear to provide a one-way driving connection between the same and said driven shaft, a positive clutch slidably mounted upon said driven shaft and adapted to be selectively moved into engagement with said gear or the driven member of said automatic clutch to provide a two-way driving connection between the same and said driven shaft respectively, means for simultaneously shifting said positive clutch into engagement with said driven member of said automatic clutch and said free wheeling clutch into engagement with said gear whereby said automatic clutch will be operable to effect a direct driving connection between said shafts, and means for simultaneously shifting said lock-up into position to interconnect said members of the automatic clutch and to shift said free wheeling clutch out of engagement with said gear.

12. Power transmitting mechanism including driving and driven shafts, clutching mechanism operably disposed between said shafts and including a pair of clutch members adapted to be driven by said driving shaft at relatively different rates, an overrunning clutch operatively disposed between said clutch members and said driving shaft, a shiftable clutch connected to said driven shaft and operable for connecting one of said clutch members to said driven shaft, the other of said clutch members forming the driving part of an automatically actuated clutch, which includes a driven part and automatically operable means for interconnecting said parts, a shiftable clutch member connected to said driven shaft and engageable with said driven part for operatively connecting the driven shaft thereto, means operable for locking up said automatically actuated clutch, means operable for locking up said overrunning clutch, manual means for operating said lockup means, and means operable for simultaneously shifting said shiftable clutch members at such time as said lockup means are inoperable.

13. In a device of the character described, the combination of driving and driven shafts, with a pair of driving means driven at relatively different rates from said driving shaft and adapted to be connected to said driven shaft for driving the same, clutching means operable for selectively connecting said driving means to said driven shaft, manipulative means for operating said clutching means, one of said driving means including a driving part, a driven part, means operable for connecting said parts together and responsive to predetermined conditions of operation of said parts, and means operable for locking up said parts without regard to the conditions of operation thereof, control means operable for rendering said lockup means inoperable, and means including said clutching means operable when said driving and driven parts are disconnected for simultaneously connecting said driven part of said driving means and the other of said driving means to said driven shaft.

14. In a device of the character described, the combination of driving and driven shafts, with a pair of driving means driven at relatively different rates from said driving shaft and adapted to be connected to said driven shaft for driving the same, clutching means operable for selectively connecting said driving means to said driven shaft, manipulative means for operating said clutching means, one of said driving means including a disconnectable clutch, control means operable for disconnecting said clutch, means including said clutching means operable when said clutch is disconnected for connecting the driven part thereof to said driven shaft simultaneously with connecting the other of said driving means to said driven shaft, and automatically actuated means operable thereafter for rendering said disconnectable clutch operable.

CARL F. RAUEN.
JOHN T. RAUEN.